(12) United States Patent
Bourdoncle et al.

(10) Patent No.: US 8,010,501 B2
(45) Date of Patent: Aug. 30, 2011

(54) COMPUTER-IMPLEMENTED METHOD, COMPUTER PROGRAM PRODUCT AND SYSTEM FOR CREATING AN INDEX OF A SUBSET OF DATA

(75) Inventors: François Bourdoncle, Paris (FR); Florian Douetteau, Paris (FR); Stéphane Donze, Torcy (FR)

(73) Assignee: Exalead, Paris (FR)

( * ) Notice: Subject to any disclaimer, the term of this patent is extended or adjusted under 35 U.S.C. 154(b) by 343 days.

(21) Appl. No.: 11/849,781

(22) Filed: Sep. 4, 2007

(65) Prior Publication Data

US 2008/0294597 A1 Nov. 27, 2008

(30) Foreign Application Priority Data

Sep. 19, 2006 (EP) .................................... 06291465

(51) Int. Cl.
*G06F 7/00* (2006.01)
(52) U.S. Cl. ...................................................... 707/673
(58) Field of Classification Search .................. None
See application file for complete search history.

(56) References Cited

U.S. PATENT DOCUMENTS

| | | | | |
|---|---|---|---|---|
| 6,349,308 | B1* | 2/2002 | Whang et al. ............. | 707/103 Z |
| 6,847,966 | B1* | 1/2005 | Sommer et al. ................ | 707/5 |
| 6,915,254 | B1* | 7/2005 | Heinze et al. .................. | 704/9 |
| 7,231,393 | B1* | 6/2007 | Harik et al. .................. | 707/100 |
| 7,383,258 | B2* | 6/2008 | Harik et al. ...................... | 707/5 |
| 2002/0188615 | A1 | 12/2002 | Latarche et al. | |
| 2005/0102270 | A1 | 5/2005 | Risvik et al. | |
| 2007/0244879 | A1* | 10/2007 | Clausner ........................ | 707/5 |

OTHER PUBLICATIONS

European Search Report, Dec. 19, 2006, European Patent Application No. EP 06 29 1465.

\* cited by examiner

*Primary Examiner* — Charles Rones
*Assistant Examiner* — Dinku W Gebresenbet
(74) *Attorney, Agent, or Firm* — Lesley S. Craig

(57) ABSTRACT

A computer implemented method for transforming an inverted index of a collection of documents into a smaller inverted index of documents. The smaller index contains links to all and only to those documents appearing in a subset of the original collection of documents. The method avoids reprocessing the subset to create the smaller inverted index by intersecting each inverted list with the list of document references from the desired subset. If this intersection is empty then the list is removed from the new smaller index, otherwise the list containing only the intersected reference list is included in the new inverted index. The method is also extended to deal with creating multiple smaller inverted indexes and with propagating updates changes in the first collection of documents down into the smaller inverted index or indexes.

11 Claims, 1 Drawing Sheet

COMPUTER-IMPLEMENTED METHOD, COMPUTER PROGRAM PRODUCT AND SYSTEM FOR CREATING AN INDEX OF A SUBSET OF DATA

FIELD OF THE INVENTION

The invention relates to the field of creation of an index of computer data. More generally, it relates to the filing, archiving or archival storage of computer data.

BACKGROUND OF THE INVENTION

Throughout the present specification, the following definitions are assumed.

Archives refer to a collection of records, and may also refer to the location in which these records are kept. Archives are made up of records which, in general, have been created in a continuous fashion, e.g. during the course of an organization's life. Usually, an archive consists of records which have been selected for pennanent or long-term preservation. In computer science, creating archives can sometimes be a cumbersome process wherein billions of data are parsed, selected and stored. In addition, said archives may need to be updated.

Besides, one knows automatic indexing. Automatic indexing begins with texts, and leads to inverted index term lists or document vectors and a dictionary.

Document vectors are e.g., for a document, a list of all words comprised therein along with how many times they appear. This may take the form ([list,5],[vector,3]).

A dictionary is e.g., a list of all unique words and their identifiers. Words can furthermore be conflated in the index by stemming or simple plural removal. Steps in automatic indexing are typically the following. First, documents (e.g., an article in an encyclopedia) are identified. Second, fields (e.g., title, author, abstract) are identified. Finally, one proceeds to parse and if necessary transform to standard forms terms like names, dates, compounds, words, abbreviations, acronyms, numbers and other special characters, etc.

An inverted index is an index structure storing a mapping from words to their locations in a document or a set of documents, giving full text search. An inverted index is assumed to be one of the most important data structure used in search engines. Such an associative array is a multimap (more than one value may be associated with a given key), and can be implemented in many ways. It could be a hash table, where the keys are words (strings), and the values are arrays of locations. There are two main variants of inverted indexes: An inverted file index contains for each word a list of references to all the documents in which it occurs. A full inverted index additionally contains information about where in the documents the words appear. This could be implemented in several ways. The simplest may be a list of all pairs of document identifiers and local positions. An inverted file index needs less space, but also has less functionality. It allows for searching terms (as a search engine), but not phrase.

As of today development of computer-implemented indexing makes that it is a common task of software to build and/or update several indexes based on one or more documents (or more generally a set of data). Typically, the creation of such indexes requires indexing the relevant reference data. However, the above operations are usually not optimized, leading to a detrimental computational effort and loss of time.

There is therefore a need for a method, a computer program product and system allowing for optimizing the creation of such indexes. Preferably, said method should further optimize the update of said indexes.

SUMMARY OF THE INVENTION

To this aim, the invention proposes a computer-implemented method for creating an index of a subset of data, comprising:
  a first step of receiving:
    a set of data;
    a first index of said set of data; and
    identifiers of a subset of data of said set; and
  a second step of creating a second index of said subset of data according to the first index and said identifiers.

In other embodiments, the method according to the invention may comprise one or more of the following features:
  the first index created at the first step is an inverted file index;
  the second step does not make use of data of the set which are not in the subset or identifiers of data of the set which are not in the subset;
  the second step comprises comparing the first index with said identifiers;
  the set of data comprises a plurality of documents, said subset being a subset of said documents;
  the first index created at the first step is an inverted file index storing a mapping from words to said documents;
  said first index comprises a plurality of inverted lists, each of said lists corresponding to a respective word of said words;
  the step of comparing the first index with said identifiers comprises computing, for each said words, an intersection of its respective list with said identifiers;
  each of said inverted lists is sorted and compressed;
  a same software component is used for implementing the first and second steps;
  the first step further comprises selecting said subset of data according to the received first index and a criterion;
  the first step comprises receiving a plurality of sets of identifiers, each set of identifiers corresponding to a respective subset of data of said set; and the second step comprises: creating a plurality of second indexes according to the first index and said sets of identifiers, each of said second indexes being an index of a respective subset of data; and
  the method according to the invention further comprises a third step of updating the first index and storing first residual data, such that the updated first index can be computed according to the index as before updating and said first residual data; and a fourth step of (i) updating the second index according to said first residual data and identifiers of the subset of data, and (ii) storing second residual data, such that the updated second index can be computed according to the second index before updating and second residual data.

The invention further concerns a computer program product implementing the method according to the invention and a computer system comprising means adapted for implementing said method.

BRIEF DESCRIPTION OF THE DRAWING

Various embodiments of the invention are now discussed, in reference to the unique figure showing a flowchart illustrating steps of the invention, according to a specific embodiment thereof.

DETAILED DESCRIPTION OF PREFERRED EMBODIMENTS

Figure 1:
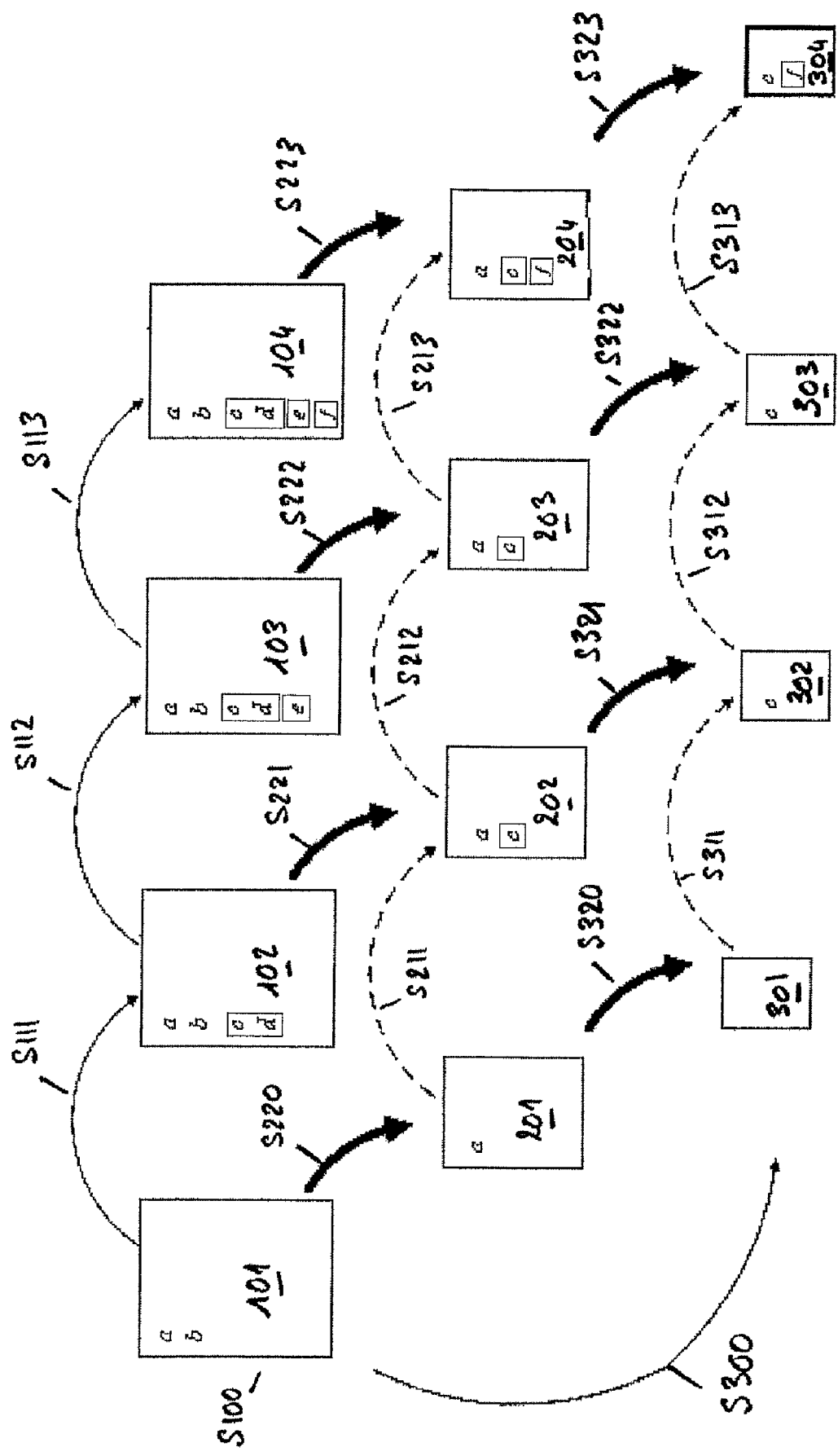

The invention hence proposes a computer-implemented method for creating an index of a subset of data. The method comprises a first step receiving: a set of data (which corresponds e.g. to an archive), a first index of said set of data, and identifiers of a subset of data of said set. The set of data is e.g. a document or a set of documents and the subset a part of said document(s). Said index is typically a full-text index. Then, the method comprises a second step of creating or updating a second index of said subset of data according to the first index and said identifiers. Preferably, no use is made of data of the set or identifiers of data which are not in the subset. Basically, crossing information related to both the first index and identifiers of the subset of data (e.g. the first index is compared with said identifiers), allows for optimizing the creation and/or update of said second index. As a result, the computational effort is lessen and substantial time is accordingly saved when archiving data.

In the following, the method according to the invention will merely be described in reference to archives or documents and subsets thereof instead of sets of data and respective subsets, because the invention applies advantageously to archival, owing to the volume of data handled. However, it should be understood that the invention also applies to any type of sets of data and, in parallel, to any subset thereof. Furthermore, it should be borne in mind that the data in question may not even be available (as in the case of offline storage) or be difficult to access (e.g. if stored on long-term archive systems such as a tape system).

In reference to FIG. 1 and as said above, the method comprises a first main step which decomposes as three substeps. The latter consist in receiving: (i) archival data (step S100), (ii) a first index 101-104 thereof and (iii) identifiers of a subset of data of said archive (also called here subarchive), the order of which is unimportant at this stage.

Said archive may consist e.g. in one or more documents, the subarchive being for instance a subset of said documents or even a part of one of said documents. For the sake of illustration, reference will sometimes be made hereafter to documents instead of data.

Note that the identifiers of the subarchive may be for instance be obtained as the result of a query, possibly a complex query involving various criteria (e.g., a judge or an authority requires having access to the index of all data concerning a given company of client, or all messages sent by a given person or to another person).

Said identifiers may e.g. consist of a list p of identifiers of documents, which may for instance read as
p: $[d_{s1}, d_{s2}, \ldots d_{sm}]$,
where $d_{si}$ denotes an identifier of the ith document of the subarchive ("s" is for subset or subarchive). The list p is preferably sorted, so as to makes the creation of the second index (as will be explained below) more efficient, from an algorithmic point of view.

Note that instead of "receiving" the first index, the latter may simply be created when not already available, in an embodiment. The first index may for instance be created according to computer-implemented processes such as known in the art.

Accordingly, the first index may preferably be an inverted file index or a full inverted file index, storing a mapping from entries (e.g. words or word identifiers) to said documents (possibly with locations). Such index structures are convenient for computational handling. Similarly, said second index may preferably be an inverted file index or a full inverted file index.

For example, said first index 101 may comprise a plurality of inverted lists, each of said lists corresponding to a respective entry (word or word identifier, etc.). For example, to the given word identifier WID may correspond the sequence:
WID→$[d_{WID,1}, d_{WID,2}, \ldots, d_{WID,n}]$,
where $d_{WID,j}$ unambiguously identifies a document wherein one or more words identified by WID appear (there are n such documents). Obviously, an inverted list may be more involved, e.g. include information related to the locations (chapter, page, etc.) of said word in the documents.

Preferably also, said inverted lists are compressed, owing to the quantity of data handled. Said lists are further sorted, for the same reason as for the list p of identifiers of documents.

As said, the method according to the invention further comprises a second step (e.g. step S220) of creating a second index 201-204 of said subarchive. Typically, said second index relates to a subpart of the document(s), corresponding to the subarchive. Reference 201 denotes the second index as created, while references 202-204 relate to updated version thereof, which will be discussed later.

Instead of being created ab initio (e.g. following the same method as for creating the first index), said second index is build according to the first index 101 and said identifiers of the subarchive. As a result of using the relevant information already present in the first index, building the second index is made more efficient. No information is lost. This can be simply achieved e.g. by comparing the first index 101 with said identifiers of the subset of documents. Namely, for each word or word identifier extracted from the first index, a corresponding list is first decompressed, if necessary, leading to e.g. a list such as $[d_{WID,1}, d_{WID,2}, \ldots, d_{WID,n}]$. Then, an intersection of said list $[d_{WID,1}, d_{WID,2}, \ldots, d_{WID,n}]$ with subset identifiers, e.g. p: $[d_{s1}, d_{s2}, \ldots d_{sm}]$ is searched, whereby only the common identifiers are retrieved. A new inverted list is accordingly build, which corresponds to said word identifier and reads as
WID→$[d_{WID,1}, d_{WID,2}, \ldots, d_{WID,k}]$
where $d_{WID,1}$ identifies a document among the k documents retrieved from the comparison. A second list is accordingly created.

Finally, the same operation is likely to be repeated for each word identifier in the initial index 101. The resulting lists will accordingly compose the second index.

As usual in the field, said second index may subsequently be securely stored, for archival storage.

As another remark, the second step does not make use of data of the archive which are not in the subarchive or identifiers of data of the archive which are not in the subarchive. Thus, in principle, only the first index 101 and said identifiers of the subarchive are needed.

Note further that the above steps are preferably implemented in such way that the above method be a computer-implemented automatic indexing method.

Advantageously, a same software component could be used for implementing the first and second steps and in particular, for creating both the first (if necessary) and second index. Said software component may be part of a computer program product, e.g. executable in a computer system, allowing for implementing the method according to the invention.

According to a further aspect of the invention, the first step of the method described above may further comprise a substep of creating said subarchive (e.g. a selection of documents). Namely, said subarchive may be selected or build based on the received first index 101 together with a criterion. Said criterion may for instance restrict the initial data to a given class of data, such as data corresponding to addresses, first names, tags, etc. In such an embodiment, advantage is taken from the availability of the first index to quickly set up the subarchive. Additional attributes related to the word identifiers may be, in that respect, stored together with (or within) the first index, so as to make easier the search by criterion. Other example of criteria will be given below.

Let us mention that the above process could be implemented so as to concurrently create a plurality of second indexes (such as index 201) according to the first index 101 and various sets of identifiers related to respective subarchives. Advantageously, the comparisons of the first index with the sets of identifiers would be parallelized, for an improved efficiency. A variant will be presented below. In addition, a third index 301-304 may be created from the second index, and so on, based on the same principles as for the second index.

Until now, mainly the creation of one or more new index (es) (that is, the "second index") was described. Now, other problems would occur when managing data files which evolve with time, thus requiring being updated.

In this respect, the above method may further comprise two additional main steps (that is, a third and a fourth step). In FIG. 1, the first, second and third lines depict respectively the first, second, and third indexes at different stages of update. Reference 101 (respectively 201, 301) denotes the first index (respectively the second and third index) as received or created. References 102-104 (respectively 202-204, 302-304) denote updated versions of said indexes.

In particular, at a third step, the first index 101 may be updated (step S111-113). Then, the first index may be stored as such. Preferably instead, first residual data may be stored, which restrict to a minimal amount of data such that the updated first index 102-103 can at least be computed based on the initial index 101 (as before update) and said first residual data. Residual data are depicted as surrounded by a square or a rectangle in FIG. 1, within a larger rectangle representing the index. For instance, the first index 102 comprises data c and d as a result of an update step, which data where not in the initial index 101. As data c and d are stored as "first residual data", they are represented within a specific rectangle. The same applies for data e in index 103, and data e and f in index 104, etc. Two different small rectangles within a same index denote separately stored residual data.

Next, at a fourth step S221, the second index can be updated and stored as such. Preferably yet, this can be achieved by storing second residual data. Again, said second residual data contain the necessary information such that the second index 202-204 (as updated) can be computed according to the second index before updating and second residual data. Advantageously, said second residual data is determined from the first residual data, e.g. by comparing said first residual data with the set of identifiers of the subarchive, in the same way as before. For example, use is made of first residual data corresponding to data c and d in index 102 for updating the second index at stage 202. In this example, only data c will match the set of identifiers, so that only data c appears in index 202. Next, data c will be stored as a residual data, and so on.

Therefore, updating the second index is made drastically more efficient. In addition, updating either the first, second, or third index does not require storing full version thereof, saving substantial memory in some applications, e.g. archival storage.

In this respect, one should keep in mind that while the curved arrows referred to as steps S211-S213 and S311-S313 corresponds to steps actually wanted by the user, the steps which are preferably performed effectively are those referred to as steps S111-S113, SS221-S223, and S321-S323, etc. For example, when the user wishes step S211 to be performed (updating the second index 201), the actual steps performed are steps S211 followed by step S221, yielding the updated second index 202. In a variant, steps S111 and S221 may be at least partially concomitantly performed, e.g. parallelized.

In addition, the update process can be repeated at any level (first, second, or third index) and at pleasure, see e.g. steps S111-113, S211-213, S311-313, etc.

Accordingly, in an embodiment, the above method makes it possible to create a set of (e.g. full-text) indexes, related to a set of documents which are likely to change with time, by repeatedly updating said indexes. Each cycle comprises receiving a number of commands, each command being defined as a series of operations which are e.g.:
  defining a subarchive (for example, a subset of documents within the initial archive);
  taking into account changes to the initial archive (occurring with time); and
  archiving the first index (related to the initial archive) in a secured place.

Then the method comprises, for each command, a step of creating a (e.g. full-text) second index based on the first index and the defined subarchive. Here again, the method thus skips a cumbersome process of entirely re-indexing the subarchive. In addition, the method according to the above embodiment allows for managing both the creation of new indexes, parallel to the update of the initial and new indexes.

As another variant, let us mention that when a plurality of second indexes (such as index 201) is to be created (e.g. concurrently), said second indexes may be created on a periodic basis. For example, the sets of identifiers of data in the subarchives may be received (created or computed) on a periodic time-basis. As an example:
  a first set of identifiers is received, which actually corresponds to documents archived during the last 15 days (first criterion), and a first "second-like" index is computed, according to the invention;
  a second set of identifiers may further be received, corresponding now to documents archived during the last 3 months (second criterion), resulting in a second "second-like" index according to the invention;
  etc.

Note that a plurality of sets of identifiers may be updated on a periodic time-basis and the corresponding second indexes be updated accordingly, in a variant.

The invention is not limited to the preferred embodiments described in reference to the drawing. Notably, the method according to the invention may comprise one or more of additional steps, after a plurality of second indexes has been obtained. Said second indexes may for instance have been obtained by successively updating one or more second indexes or by concurrently building several second indexes as described above. Then, the method may comprise steps of:
  receiving a user query, said query comprising e.g. textual information and being limited to a selection of documents (and possibly to a given time period); and
  finding the minimal set of second indexes which are necessary for satisfying the user query, based on both said selection and said second indexes. Finding said minimal set may for instance be achieved by computing e.g. and intersection between documents identified in both the selection and the second indexes.

Said query may further be limited to a given period of time, whereby residual data can be involved, if necessary, as explained in details above.

As an example, let us consider that:

(i) the initial set of data (the whole documents) can be partitioned according to given rules (for example a subjective choice), that is, such as to form the subsets: A, B, C, D, E, and F; and (ii) four second indexes have been built, e.g. according to rules such as described above (based on an initial index and four sets of identifiers of a subset of documents), such that the following correspondence is obtained:

a first second-like index I_1 covers subsets A and B;
I_2 covers A, B, and C;
I_3 covers A, B, C, and D; and
I_4 covers E, and F.

Furthermore, considering updates of said second index, for example corresponding to time intervals t0 to t1, t1 to t2, t2 to t3, the following residues will be stored: r_i, r_i,2, r_i,3 (according e.g. to steps discussed above), where r_i,j corresponds to residual data associated with index I_i for the time interval t_(j−1) to t_j, being understood that I_i correspond to t0.

Now, let us assume a query pertaining to given textual data, set of documents and time interval. For example, the user is looking for documents containing the word "Toto" in C, D, and E, as defined above, with the further constraint that the documents have been updated between times t1' et t2' (wherein t1<t1'<t2<t2'<t3).

The reader will realize that the (second) indexes relevant to the above query are I_2 (owing to C), I_3 (owing to both C and D) and I_4 (owing to E). Next, one understands that the second index I_2 needs not be taken into account for satisfying the query. Accordingly, the first set may be limited {I_2, I_3, I_4} to the minimal set required, that is: {I_3, I_4}. To achieve this, it may compute an intersection of identifiers of documents referred to in both the query and the available second indexes.

Besides, the minimal relevant time interval for fulfilling said query is t1 to t3. Therefore, residual data to take into account are those corresponding to intervals t1 to t2 and t2 to t3. Accordingly, a search is carried as regards the word "Toto" using residual data r_3,2, r_3,3, r_4,2, and r_4,3.

Other applications or implementations of the method according to the invention can obviously be contemplated, based on the above disclosure.

For instance, as outlined in introduction, an inverted index may possibly contain information beyond the simple mapping from words to documents (and possibly their locations therein). As an exemplary embodiment, the present indexes may be supplemented by a thesaurus (e.g. external or pointing thereto). A thesaurus is here contemplated as a data structure which maps words to identifiers and possibly contains a lemma and/or statistics related to occurrences of words in documents. Accordingly, while a first thesaurus may correspond to a first index, a second thesaurus may be created which correspond to the second index. To achieve this, the second thesaurus is created so as to contain each word of the first thesaurus for which an inverted list related to the second index exists (or equivalently, is not empty). Additionally, statistics in the thesaurus may be adjusted based on lengths of inverted list.

Moreover, various implementations may be contemplated with respect to how documents are identified. In this respect, one may use identifiers (call them DocIDs) such as integers which are stored on inverted lists.

Said DocIDs may be attributed progressively, following the train of documents being archived or ex post facto, e.g. by sorting documents according to a given criterion (e.g. popularity).

In a variant, one may attribute small DocIDs to the most popular or most important documents (e.g. the smaller the integer, the most popular the document). As inverted lists are themselves sorted, the most popular documents will be located at the beginning of the lists. As such, DocIDs prove particularly advantageous. First, when processing queries, DocIDs can be used to compute scores of relevance of the documents. One may for instance use functions such as 1/log(a d+c), where d is a numerical value and a and c are constants, to measure the relevance. Furthermore, processing queries may restrict to parse to beginning of the lists only, which speeds up processing times. Yet, such a scheme turns out efficient as it allows in practice for returning a sufficient number of relevant documents.

As per the implementation of such DocIDs in the method according to the invention, one may proceed as follows. During the creation of the second index, one can choose either to:
keep DocIDs identical to those appearing in the first index;
preserve the order of the DocIDs as in the first index, but re-use DocIDs left free by the process. This has the advantage of reducing the interval between DocIDs, which in turn makes it possible to decrease size of the compressed inverted lists, as compression works better in this case; or
reordering DocIDs according to a new criterion. Consider for instance the following situation: the first (larger) index contains references to all the e-mails of a public corporation. Such an index uses for instance DocIDs ordered according to criteria of popularity or relevance to the corporation. When one seeks to constitute an index of files restricted to emails sent by a given person P, who is manager of a team T. In that respect, one may wish that the DocIDs in the second index be ordered according to criteria of popularity or relevance specific to P. For this purpose, the DocIDs of the second index may be reordered so that emails sent to members of the team T have smallest identifiers, as such emails are likely to be the most "popular", from the view point of the corporation.

Lastly, as evoked above, thesauruses may store information related to statistics of words. This turns very advantageous for improving the relevance of spell checking. Consider for instance the following situation: files are stored on computer storage means such as a local hard disk or remote files and are indexed. Subset of files may further be subsequently indexed according to the invention. Then, when receiving an action (e.g. a query) involving one first word, it may be returned a second word, which may be selected according to both a distance from said first word (e.g. the usual criterion) and to occurrence data in the first or second index, depending on the query. Occurrences data may be a simple function of said number of occurrences, which for example varies like the Logarithm function. The occurrence data will influence the selection process according the usage frequencies. Such a solution allows for providing corrections which are relevant ex ante, with respect to the stored files.

The invention claimed is:

1. A computer-implemented method for creating an inverted index of a subset of data, comprising:

executing in a computer system processor a software component of a computer program product, wherein said executing of the software component configures the computer system to perform:

a first step of receiving from computer storage:

a set of data;
a first inverted index of said set of data; and
identifiers of a subset of data of said set; and
a second step of creating, without reprocessing the data identified by said identifiers, a second inverted index using only the first inverted index and said identifiers, said second inverted index being both an inverted index of said subset of data and a subset of said first inverted index, wherein said second step of creating comprises comparing the first inverted index with said identifiers, and wherein said second step does not make use of data of the set which are not in the subset or identifiers of data of the set which are not in the subset.

2. The method of claim 1, wherein the set of data comprises a plurality of documents, said subset being a subset of said documents.

3. The method of claim 2, wherein the first inverted index created at the first step is an inverted file index storing a mapping from words to said documents.

4. The method of claim 3, wherein said first inverted index comprises a plurality of inverted lists, each of said lists corresponding to a respective word of said words.

5. The method of claim 4, wherein the step of comparing the first inverted index with said identifiers comprises computing, for each said words, an intersection of each respective list with said identifiers.

6. The method of claim 4 wherein each of said inverted lists is sorted and compressed.

7. The method of claim 1, wherein the first step further comprises selecting said subset of data according to the received first inverted index and a criterion.

8. The method of claim 1, wherein:
the first step comprises receiving a plurality of sets of identifiers, each set of identifiers corresponding to a respective subset of data of said set; and
the second step comprises: creating a plurality of second inverted indexes according to the first inverted index and said sets of identifiers, each of said second inverted indexes being an inverted index of a respective subset of data.

9. The method of claim 1, further comprising:
a third step of updating the first inverted index and storing first residual data, such that the updated first inverted index is computed according to the inverted index as before updating and said first residual data; and
a fourth step of
updating the second inverted index according to said first residual data and identifiers of the subset of data, and
storing second residual data, such that the updated second inverted index is computed according to the second inverted index before updating and second residual data.

10. A computer program product on a computer readable storage medium, the computer program product including a software component executable by a computer system processor to perform the steps of:
a first step of receiving from computer storage:
a set of data;
a first inverted index of said set of data; and
identifiers of a subset of data of said set; and
a second step of creating, without reprocessing the data identified by said identifiers, a second inverted index using only the first inverted index and said identifiers, said second inverted index being both an inverted index of said subset of data and a subset of said first inverted index, wherein said second step of creating comprises comparing the first inverted index with said identifiers, wherein said second step does not make use of data of the set which are not in the subset or identifiers of data of the set which are not in the subset.

11. A computer system comprising:
computer storage; and
a computer program product including a software component executable by a computer system processor to perform the steps of:
a first step of receiving from said computer storage:
a set of data;
a first inverted index of said set of data; and
identifiers of a subset of data of said set; and
a second step of creating, without reprocessing the data identified by said identifiers, a second inverted index using only the first inverted index and said identifiers, said second inverted index being both an inverted index of said subset of data and a subset of said first inverted index, wherein said second step of creating comprises comparing the first inverted index with said identifiers, and wherein said second step does not make use of data of the set which are not in the subset or identifiers of data of the set which are not in the subset.

* * * * *

UNITED STATES PATENT AND TRADEMARK OFFICE
CERTIFICATE OF CORRECTION

| | | |
|---|---|---|
| PATENT NO. | : 8,010,501 B2 | |
| APPLICATION NO. | : 11/849781 | |
| DATED | : August 30, 2011 | |
| INVENTOR(S) | : François Bourdoncle, Florian Douetteau and Stéphane Donze | |

It is certified that error appears in the above-identified patent and that said Letters Patent is hereby corrected as shown below:

Column 1, line 22, delete "pennanent" and insert therefore --permanent--.

Column 3, line 54, delete "ith" and insert therefore --*ith*--.

Signed and Sealed this

Eighteenth Day of October, 2011

David J. Kappos
*Director of the United States Patent and Trademark Office*